(12) United States Patent
Yoder (10) Patent No.: US 9,137,982 B2
(45) Date of Patent: Sep. 22, 2015

(54) CONVERTIBLE TREESTAND

(71) Applicant: Kevin L. Yoder, Crouse, NC (US)

(72) Inventor: Kevin L. Yoder, Crouse, NC (US)

( * ) Notice: Subject to any disclaimer, the term of this patent is extended or adjusted under 35 U.S.C. 154(b) by 254 days.

(21) Appl. No.: 13/867,566

(22) Filed: Apr. 22, 2013

(65) Prior Publication Data

US 2014/0311824 A1    Oct. 23, 2014

(51) Int. Cl.
*A63B 27/00*    (2006.01)
*A01M 31/00*    (2006.01)
*A01M 31/02*    (2006.01)
*B62B 1/12*    (2006.01)

(52) U.S. Cl.
CPC ............. *A01M 31/006* (2013.01); *A01M 31/02* (2013.01); *A63B 27/00* (2013.01); *B62B 1/12* (2013.01); *Y10T 29/49716* (2015.01)

(58) Field of Classification Search
CPC . A01M 31/02; A01M 31/025; A01M 31/006; A63B 27/00; A63B 27/02; A63B 27/04; B62B 1/12; B62B 2205/10; E06C 1/397
See application file for complete search history.

(56) References Cited

U.S. PATENT DOCUMENTS

| 4,321,982 | A | * | 3/1982 | Strickland | ...................... 182/20 |
|---|---|---|---|---|---|
| 5,105,908 | A | | 4/1992 | Freund | |
| 5,492,196 | A | | 2/1996 | Michno | |
| 5,624,008 | A | * | 4/1997 | Beardslee, Jr. | ................. 182/136 |
| 6,516,919 | B1 | * | 2/2003 | Sempel | ........................... 182/20 |
| 7,306,074 | B2 | * | 12/2007 | Voorhies | ....................... 182/136 |
| 7,849,964 | B2 | | 12/2010 | Amacker et al. | |
| 7,967,325 | B1 | | 6/2011 | Burton et al. | |
| 8,256,794 | B1 | | 9/2012 | Burton et al. | |
| 2004/0222040 | A1 | * | 11/2004 | Zirk | .............................. 182/136 |
| 2009/0178884 | A1 | | 7/2009 | Maletestinic et al. | |
| 2009/0205905 | A1 | * | 8/2009 | Amacker et al. | ................ 182/20 |
| 2010/0013182 | A1 | * | 1/2010 | Kergosien et al. | ............ 280/204 |
| 2011/0140382 | A1 | * | 6/2011 | Scheermesser | .......... 280/47.131 |
| 2012/0080268 | A1 | | 4/2012 | Bedell | |
| 2014/0238776 | A1 | * | 8/2014 | Vandergraff | .................... 182/20 |

* cited by examiner

*Primary Examiner* — Colleen M Chavchavadze
(74) *Attorney, Agent, or Firm* — Trego, Hines & Ladenheim, PLLC (57) ABSTRACT

A convertible treestand has been disclosed. The convertible treestand includes a lower standing platform adapted to be secured to a tree and an upper seating platform adapted to be secured to the tree at a position above the lower standing platform and to provide a user with a seat. The lower standing platform includes an outer frame having a front end and first and second spaced-apart sides and a support platform secured between the first and second sides to provide a user with a platform to stand on. The convertible treestand further includes a wheel assembly secured to the lower standing platform in a storage position such that the wheel assembly lies between the first and second sides and in the same plane as the support platform.

18 Claims, 7 Drawing Sheets

CONVERTIBLE TREESTAND

BACKGROUND OF THE INVENTION

This application relates to a treestand, and more particularly, to a convertible treestand that can be used as a cart for carrying game or supplies.

Treestands are a staple in the hunting industry. Hunters use treestands to elevate themselves above the ground when hunting game such as deer. By elevating themselves, hunters are able to decrease their presence to game while improving their ability to sit quietly for extended periods of time, increase their visibility to monitor game walking around them, and improve their shooting lanes and, thereby, increase their ability to get off a clean shot.

Treestands come in various types—ladder stands, hanging or locked-on type stands, and climbing stands. Ladder stands and fixed stands are typically used by land owners or hunters hunting land where theft is of little concern. These stands are mounted to a tree and left in place so that a hunter simply walks to the stand and then climbs a ladder or steps to the stand. These types of stands eliminate the need to carry a stand and set it up each time the hunter goes hunting; however, they also eliminate the ability to hunt different locations. As a result, these types of stands are very popular where multiple stands are dispersed about a piece of land to allow multiple hunters to hunt an area or to allow a single hunter to move from one location to another.

Figure 1:
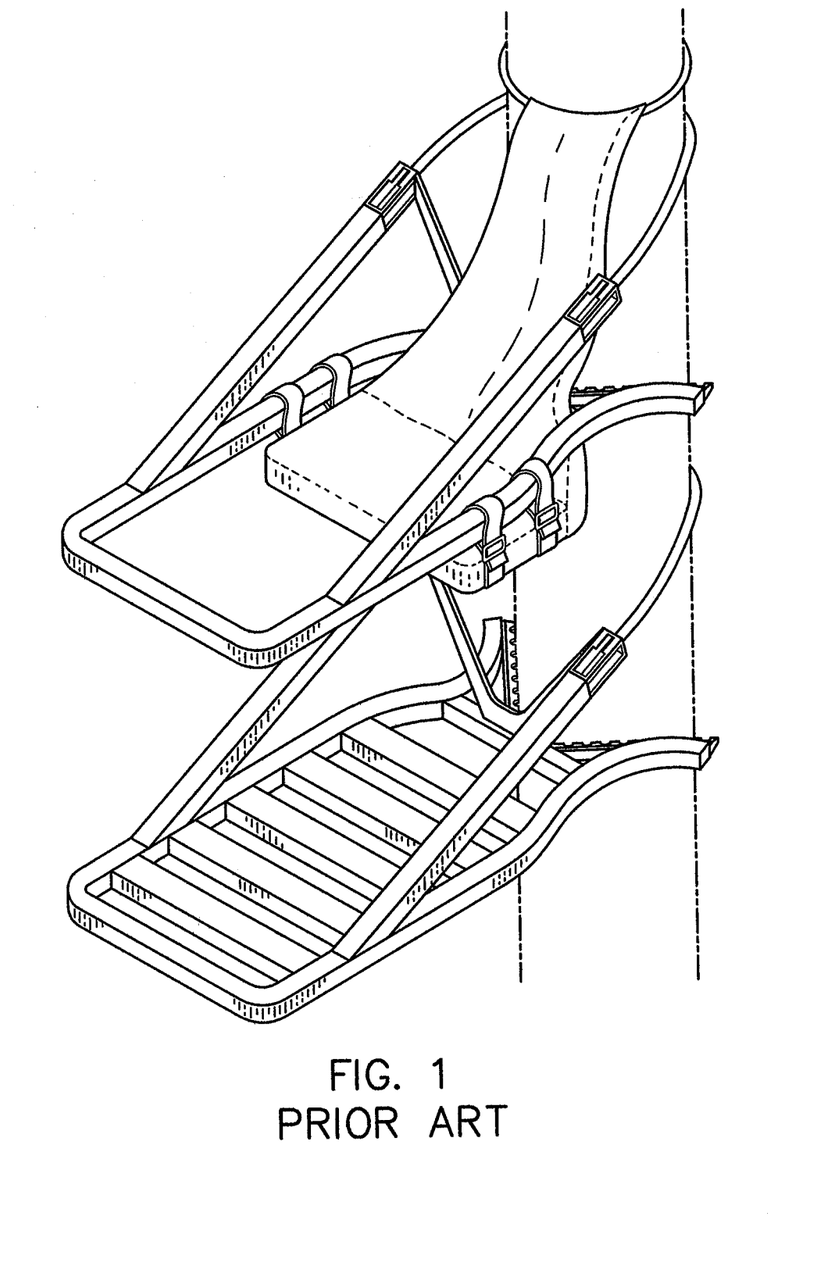
FIG. 1 is a prior art treestand.

The most versatile stands are the climbing stands. Because of this versatility, climbing stands have become very popular amongst hunters. Climbing stands allow a hunter to hunt different locations on a single piece of land or to hunt different pieces of land such as a state forest, family owned land, or hunting trips to different states. Thus, a hunter only needs to buy a single climbing stand to hunt multiple areas. FIG. 1 shows a typical climbing stand.

In use, a climbing stand is typically carried on the hunter's back to an area the hunter has designated for placement of the stand. Once the designated area has been reached, the hunter first attaches a lower standing platform to a tree by wrapping an attachment device such as a cord, chain, strap, or V-shaped metal arm around the tree from a first connection point of the stand to a second connection point of the stand. The attachment device is secured at both connection points, thereby attaching the lower standing platform to the tree. The upper seating platform is then attached to the tree at a position above the standing platform in the same manner.

The hunter then stands on the lower standing platform and moves the upper seating platform upwardly to a new position on the tree. Using an up and down motion, the hunter then moves the lower standing platform upwardly to a new position on the tree and continues this process until the upper and lower platforms are at a desired height on the tree. The platforms are then secured and the hunter begins his/her hunt.

The problem with climbing treestands occurs when the hunter shoots and kills a large game animal. Often hunters walk one mile or more from their vehicle to their designated hunting area. Typically, when a hunter kills a large game animal, the hunter climbs down the tree using the up and down motion and then detaches the treestand from the tree and packs it up for carrying on the hunter's back. The hunter then prepares the game animal for removal from the land and back to the hunter's vehicle. Removal requires the hunter to carry the treestand on his/her back and drag a game animal weighing between 100 and 200 pounds over rough terrain for a significant distance, carry the treestand back to the vehicle and then come back and drag the game animal, or carry the treestand back to the vehicle and bring a game cart back to the animal for removal.

BRIEF SUMMARY OF THE INVENTION

These and other shortcomings of the prior art are addressed by the present invention, which provides a convertible treestand that provides a hunter with a climbing treestand to hunt different locations and that converts into a game cart to allow the hunter to easily remove the animal from the hunting area.

According to one aspect of the present invention, a convertible treestand includes a lower standing platform adapted to be secured to a tree, and an upper seating platform adapted to be secured to the tree at a position above the lower standing platform and to provide a user with a seat. The lower standing platform includes an outer frame having a front end and first and second spaced-apart sides, and a support platform secured between the first and second sides to provide a user with a platform to stand on. The convertible treestand further includes a wheel assembly secured to the lower standing platform in a storage position such that the wheel assembly lies between the first and second sides and in the same plane as the support platform.

According to another aspect of the invention, a convertible treestand includes a lower standing platform adapted to be secured to a tree. The lower standing platform includes an outer frame having a front end and first and second spaced-apart, parallel sides extending rearwardly from opposing ends of the front end; a rear end member secured between the first and second sides at a rear end of the lower standing platform such that the rear end member is positioned in a spaced-apart, parallel relation to the front end; a support platform secured between the first and second sides to provide a user with a platform to stand on, the support platform extending from the front end to an approximate midpoint of the lower standing platform; and a carriage member secured between the first and second sides and positioned between the support platform and the rear end member. The convertible treestand further includes an upper seating platform adapted to be secured to the tree at a position above the lower standing platform and to provide a user with a seat, and a wheel assembly secured to the rear end member and supported by the carriage member such that the wheel assembly lies between the first and second sides and between the support platform and the rear end member in a storage position.

According to another aspect of the invention, a method of converting a treestand into a cart includes the steps of providing a convertible treestand having a lower standing platform having first and second spaced-apart, parallel sides and first and second arms extending from the first and second sides; an upper seating platform having first and second spaced-apart, parallel sides and first and second arms extending from the first and second sides; and a wheel assembly. The method further includes the steps of forming a cart assembly by connecting distal ends of the first and second sides of the lower standing platform to corresponding distal ends of the first and second sides of the upper seating platform, and connecting first and second connectors of the lower standing platform to respective first and second connectors of the upper seating platform, such that distal ends of the first and second arms of the lower standing platform and distal ends of the first and second arms of the upper seating platform are substantially aligned. The method further includes the step of connecting the wheel assembly to the cart assembly.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 2:
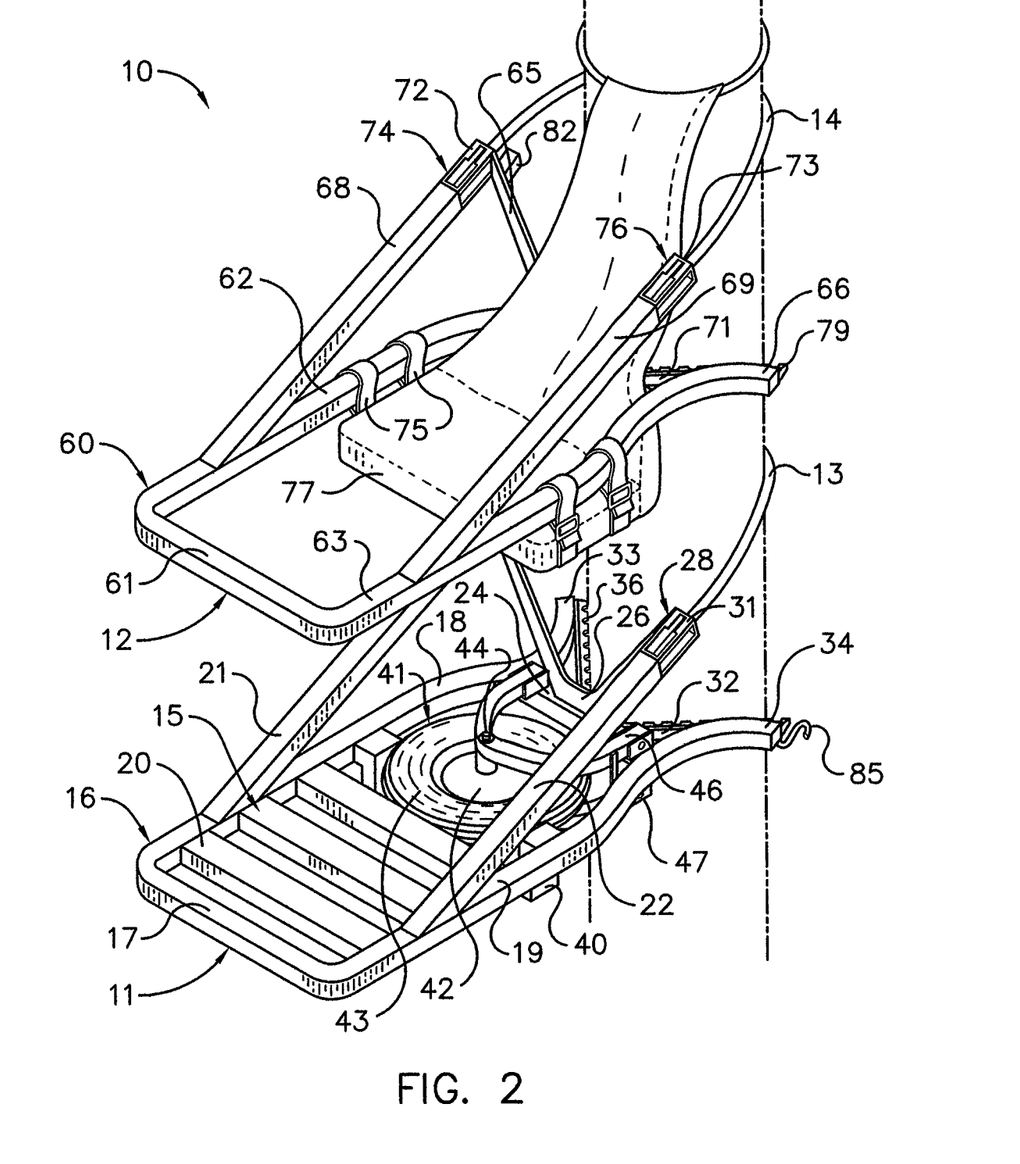
FIG. 2 is a perspective view of a convertible treestand according to an embodiment of the invention.

Referring to the drawings, an exemplary convertible treestand according to an embodiment of the invention is illustrated in FIG. 2 and shown generally at reference numeral 10. The treestand 10 includes a lower standing platform 11 and an upper seating platform 12. Each of the platforms 11 and 12 are releasably secured to a tree by attachment devices 13 and 14, respectively. As shown, the attachment devices 13 and 14 are flexible cords; however, it should be appreciated that other attachment devices such as chains, straps, and V-shaped metal arms may also be used.

Figure 3:
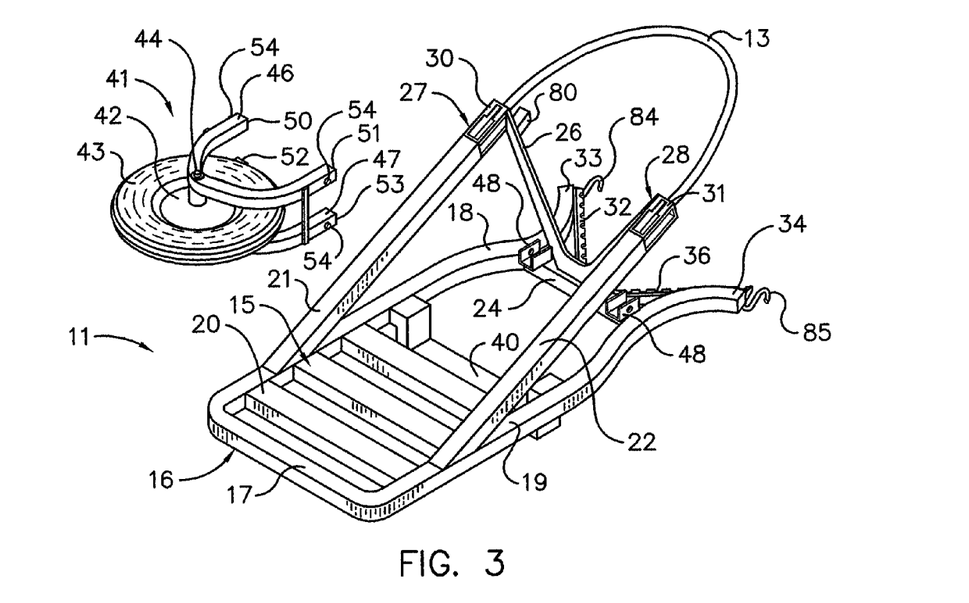
FIG. 3 shows a lower standing platform of the convertible treestand of FIG. 2 with a wheel removed.

Referring to FIGS. 2 and 3, the lower standing platform 11 includes a tubular outer frame 16 having a front end 17, first and second, parallel sides 18 and 19 extending from opposing ends of the front end; a support platform 15 for a user to rest his feet or stand on, the stand platform being formed of a plurality of tubular inner cross-members 20 extending between and connected to the parallel sides 18 and 19; and first and second arms 21 and 22 extending upwardly at an angle from the sides 18 and 19 of the tubular outer frame 16. It should be appreciated that the platform 15 may be formed of a mesh-type, grid-type, honeycomb-type, or any other suitable structure. The arms 21 and 22 are connected to the sides 18 and 19, respectively, near the front end 17 of the platform and extend upwardly towards a rear end member 24 of the platform 11 where a bracket 26 extends upwardly from the rear end member 24 and supports distal ends 27 and 28 of the arms 21 and 22. Distal ends 27 and 28 each include receivers 30 and 31 for receiving opposing ends of the attachment device 13 to secure the standing platform 11 to the tree.

Sides 18 and 19 each curve inwardly for connection to the rear end member 24 and then curve outwardly from the rear end member 24 to allow the platform 11 to accept different diameter trees. A gripping member 32 extends between and is connected to distal ends 33 and 34 of the sides 18 and 19 and is connected to the rear end member 24 at a center point to form a V-shaped gripping member 32. The gripping member 32 includes teeth 36 formed therein such that when the platform 11 is installed on a tree, the gripping member 32 engages the tree to provide a stable platform.

A carriage member 40 extends between and is connected to sides 18 and 19 at a position about midway between the front end 17 and rear end member 24 to support a wheel assembly 41 having a wheel 42 and a tire 43 mounted thereon. The tire 43 may be a typical tube-based tire, a tubeless tire, or an airless solid rubber tire. As illustrated, the carriage member 40 extends below the cross-members 20 so that the wheel assembly 41 lies in the same plane as the cross-members 20. The wheel assembly further includes an axle 44 to allow the wheel 42 and tire 43 to rotate thereupon and a pair of U-shaped brackets 46 and 47 connected to the axle 44 on opposing sides of the wheel assembly 41 to secure the wheel assembly to the platform 11 in a storage position and to a cart assembly (shown in FIGS. 5 and 6) in a use position.

The wheel assembly 41 is releasably secured to the platform 11 by a plurality of U-shaped brackets 48 mounted to the rear end member 24. As shown, two brackets 48 are mounted to a top side of the rear end member 24 in spaced-apart relation. To secure the wheel assembly 41 in the storage position, bracket 46 is placed in mating engagement with brackets 48. As shown, distal ends 50 and 51 of bracket 46 are placed in mating engagement with brackets 48 mounted on the top side of rear end member 24 and distal ends 52 and 53 of bracket 47 are left unsupported along a bottom side of rear end member 24. The bracket 46 is releasably secured to the brackets 48 by fasteners 54. As illustrated, the fasteners 54 are spring-loaded pins to allow the bracket 46 to be easily disengaged from brackets 48; however, it should be appreciated that other fasteners such as bolts may be used.

Like the lower standing platform, the upper seating platform 12 includes a tubular outer frame 60 having a front end 61, first and second, parallel sides 62 and 63 having distal ends 64 and 66, first and second arms 68 and 69 extending upwardly at an angle from the sides 62 and 63, a rear end member 70, a bracket 65, and a gripping member 71. As with platform 11, platform 12 is secured to the tree using attachment device 14 by securing opposing ends of the device 14 to receivers 72 and 73 which are disposed on distal ends 74 and 76 of arms 68 and 69, respectively. A seat 77 is secured to the seating platform 12 using straps 75.

In use, the treestand 10 is used in the same manner as described above with respect to climbing stands. In other words, a hunter carries the stand on his/her back to the desired location, mounts the lower and upper platforms 11 and 12 to the tree, climbs the tree, and secures the platforms 11 and 12 to the tree at the desired height. Once the hunter harvests a game animal, the hunter climbs down the tree, dresses the game animal and prepares it for removal.

Figure 4:
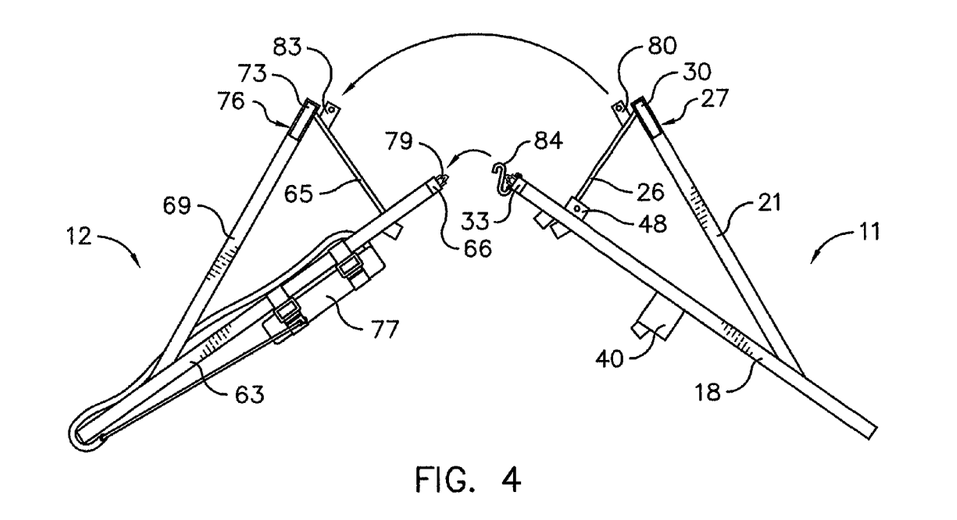
FIG. 4 shows the lower standing platform of FIG. 3 being connected to an upper seating platform of the convertible treestand of FIG. 2 to form a cart support structure.
Figure 5:
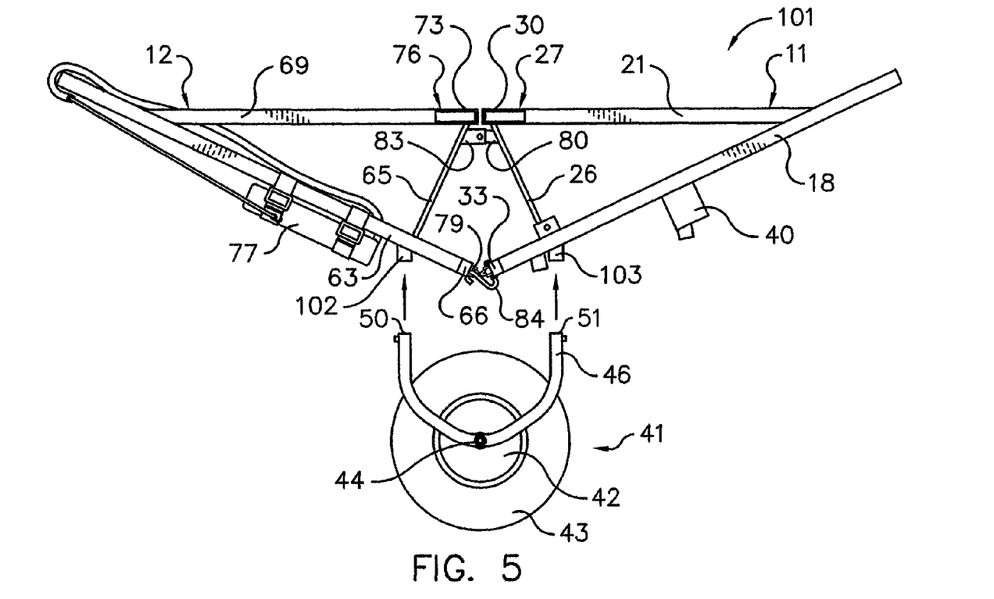
FIGS. 5 and 6 show the wheel of FIG. 3 being attached to the cart support structure of FIG. 4 at first and second positions to form a wheeled cart.
Figure 6:
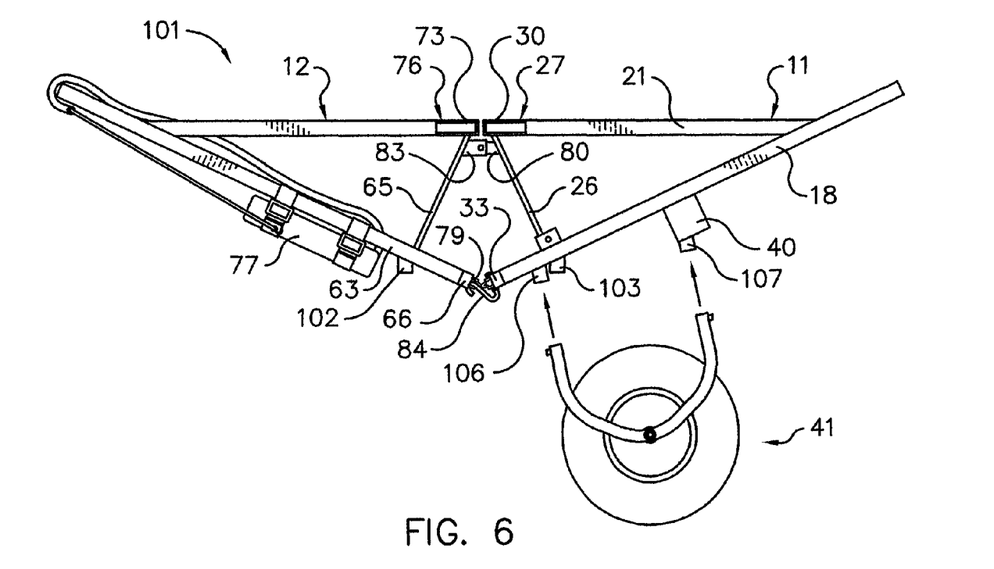
Figure 7:
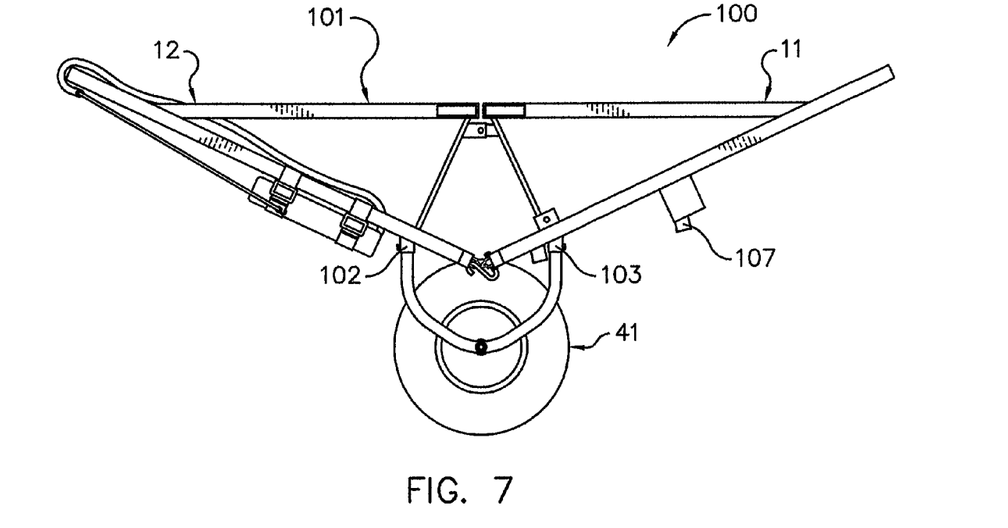
FIG. 7 is a side view of the wheeled cart of FIG. 5.
Figure 8:
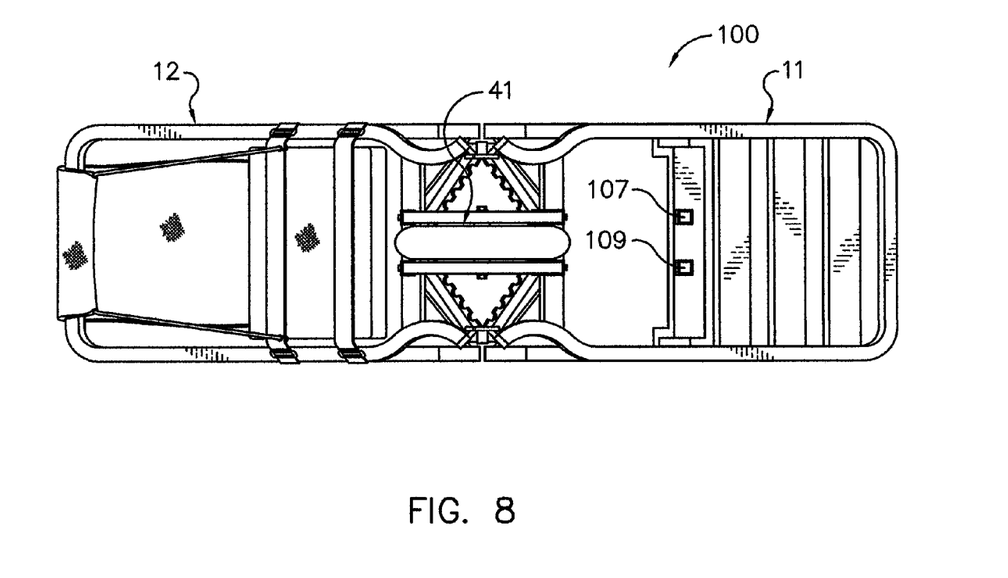
FIG. 8 is a bottom view of the wheeled cart of FIG. 5.
Figure 9:
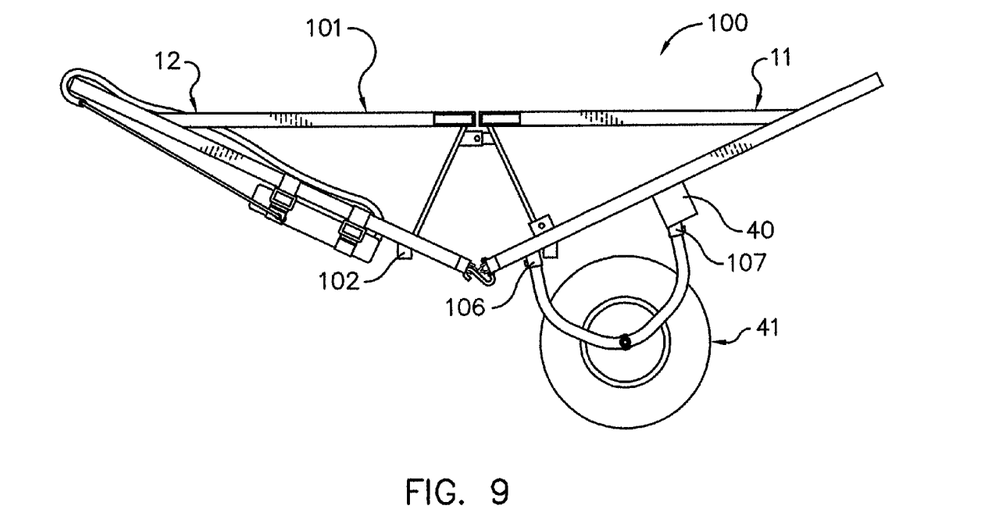
FIG. 9 is a side view of the wheeled cart of FIG. 6.
Figure 10:
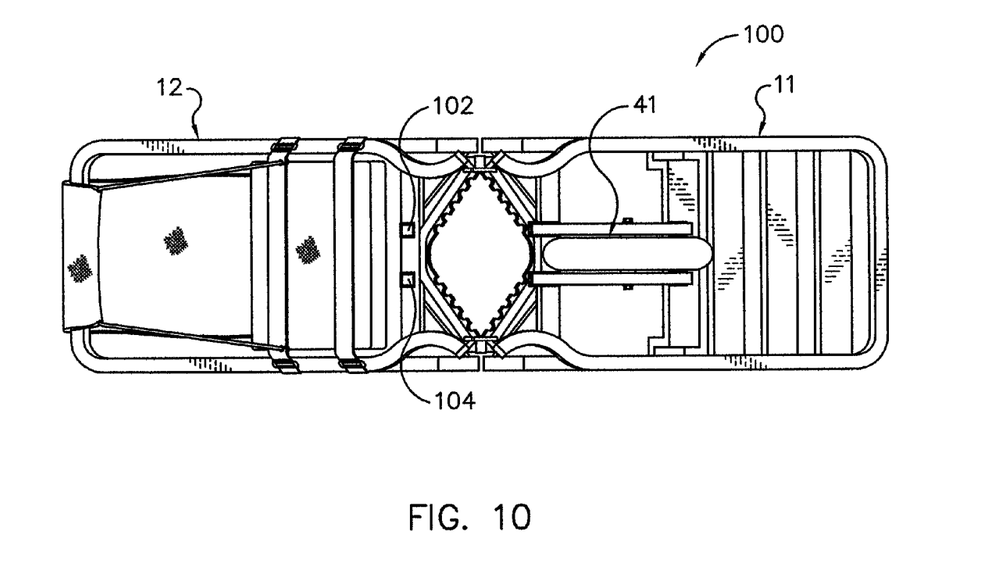
FIG. 10 is a bottom view of the wheeled cart of FIG. 6.
Figure 11:
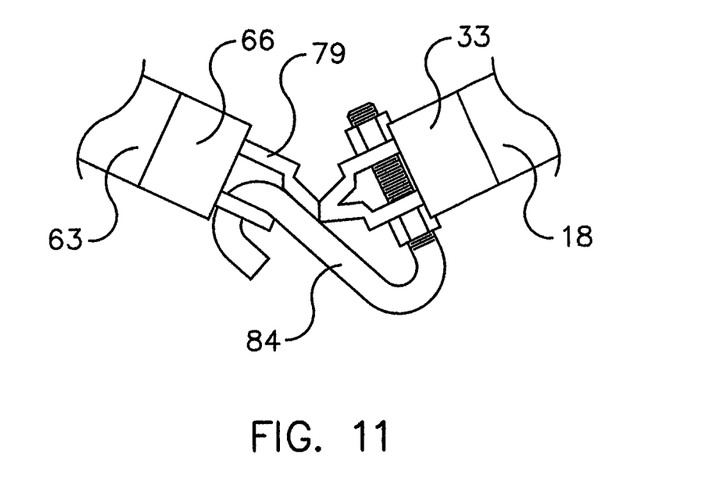
FIG. 11 shows a hook type connection between the upper and lower platforms.

Referring to FIGS. 4-6, once the animal is prepared for removal, the hunter converts the treestand 10 into a cart 100 (shown in FIGS. 7-8 with a centered wheel assembly and FIGS. 9-10 with a non-centered wheel assembly) to allow the hunter to easily remove the animal. As shown, the cart 100 is formed by connecting the lower and upper platforms 11 and 12 at four locations to form a cart assembly 101. The first and second locations are the connection of distal end 33 to distal end 66 and distal end 34 to distal end 64 by using connectors 84 and 85 disposed on distal ends 33 and 34, respectively, to connect to receivers 78 and 79 disposed on distal ends 64 and 66, respectively. As shown, the connectors 84 and 85 are hook-type connectors (shown in detail in FIG. 11); however, it should be appreciated that other suitable connectors may be used. It should also be appreciated that fasteners such as bolts may be used in place of the hook-type connectors.

The third and fourth locations are located adjacent distal ends 27 and 28 and 74 and 76. As shown, male connectors 80 and 81 connected to bracket 26 adjacent to distal ends 27 and 28 and female connectors 82 and 83 connected to bracket 65 adjacent to distal ends 74 and 76 are connected together. Male connector 80 is secured to female connector 83 and male connector 81 is secured to female connector 82. As shown, the male and female connectors are releasably secured together by a spring-loaded pin extending through an aperture; however, it should be appreciated that other fastening means such as bolts may be used. It should also be appreciated that the male and female connectors may be reversed; for example, the male connectors 80 and 81 may be positioned on bracket 65 and the female connectors 82 and 83 positioned on bracket 26 or any combination thereof.

Once the cart assembly 101 has been formed, the wheel assembly 41 is mounted to the cart assembly 101 to allow the cart to be pushed or pulled by the hunter. As shown in FIGS. 5 and 6, the wheel assembly may be mounted in a center of the cart assembly 101, FIG. 5, or mounted off to one side of the cart assembly 101, FIG. 6.

Figure 12:
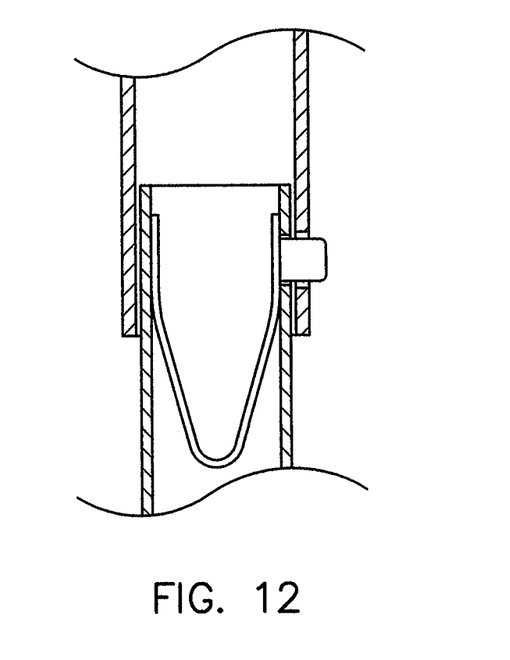
FIG. 12 shows a spring-loaded pin type connection between the upper and lower platforms and between the wheel and cart support structure.

To mount the wheel assembly 41, distal ends 50, 51 of bracket 46 and distal ends 52, 53 of bracket 47 are inserted into receivers positioned along a bottom of the cart assembly. For example, when mounting the wheel assembly 41 in a centered position (FIG. 5), distal ends 50 and 51 are received by receivers 102 and 103, respectively, and distal ends 52 and 53 are received by receivers 104 and 105, respectively. The distal ends 50, 51, 52, and 53 are secured in the respective receivers by spring-loaded pins 54 extending through apertures in the receivers. When mounting the wheel assembly 41 in a non-centered position (FIG. 6), distal ends 50 and 51 are received by receivers 106 and 107, respectively, while distal ends 52 and 53 are received by receivers 108 and 109, respectively. The spring-loaded fastener connection is shown in detail in FIG. 12.

The foregoing has described a convertible treestand. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A convertible treestand, comprising:
   (a) a lower standing platform adapted to be secured to a tree, the lower standing platform including:
      (i) an outer frame having a front end and first and second spaced-apart sides; and
      (ii) a support platform secured and connected directly to the first and second sides to provide a user with a platform to stand on, the support platform extending between the front end and a midpoint of the lower standing platform;
      (iii) a rear end member extending between the first and second sides and spaced rearwardly from the support platform;
   (b) an upper seating platform adapted to be secured to the tree at a position above the lower standing platform and to provide a user with a seat; and
   (c) a wheel assembly having a single wheel rotatably mounted on an axle that extends between two spaced-apart parallel U-shaped brackets, the wheel assembly being releasably secured to the rear end member of the lower standing platform in a storage position such that the wheel assembly lies between the first and second sides.

2. The convertible treestand according to claim 1, wherein the lower standing platform and upper seating platform are secured to the tree by an attachment device wrapped around the tree.

3. The convertible treestand according to claim 1, wherein the lower standing platform includes first and second arms extending upwardly at angle away from the front end of the lower standing platform, and wherein a receiver is positioned at a distal end of each of the first and second arms to receive an end of an attachment device.

4. The convertible treestand according to claim 3, wherein the attachment device secures the lower standing platform to the tree by wrapping the attachment device around the tree and securing opposing ends of the attachment device in respective ones of the receivers.

5. The convertible treestand according to claim 1, wherein the seat is secured to an outer frame of the upper seating platform.

6. A convertible treestand, comprising:
   (a) a lower standing platform adapted to be secured to a tree, the lower standing platform including:
      (i) an outer frame having a front end that defines a front end of the lower standing platform, and first and second spaced-apart, sides extending rearwardly from opposing ends of the front end;
      (ii) a rear end member secured between the first and second sides, such that the rear end member is positioned in a spaced-apart, parallel relation to the front end of the lower standing platform, and defines a rear end of the lower standing platform;
      (iii) a support platform secured and connected directly to the first and second sides to provide a user with a platform to stand on, the support platform extending from the front end a midpoint of the lower standing platform, the support platform being spaced away from the rear end member; and
      (iv) a carriage member secured between the first and second sides and positioned between the support platform and the rear end member of the lower standing platform, such that the carriage member, a rear end of the support platform, and the rear end member collectively define an open storage well;
   (b) an upper seating platform adapted to be secured to the tree at a position above the lower standing platform and to provide a user with a seat; and
   (c) a wheel assembly releasably secured to the rear end member of the lower standing platform and supported by the carriage member in the open storage well in a storage position.

7. The convertible treestand according to claim 6, wherein the wheel assembly includes a wheel having an axle extending through a center thereof and a tire mounted to the wheel.

8. The convertible treestand according to claim 7, wherein the wheel assembly further includes first and second brackets secured to opposing ends of the axle, and wherein the wheel assembly is secured to the rear end member by the first and second brackets.

9. The convertible treestand according to claim 6, wherein the carriage member extends below the support platform to allow the wheel assembly to be supported in the same plane as the support platform.

10. A convertible tree stand according to claim 6, wherein:
(a) each of the first and second spaced-apart sides includes a distal end at the rear end of the lower standing platform, the lower standing platform further including first and second arms extending away from the first and second sides, respectively, at an acute angle, each of the first and second arms having a distal end at the rear end of the lower standing platform;
(b) the upper seating platform
includes first and second spaced-apart sides with distal ends at a rear of the upper seating platform
and first and second extending away from the first and second sides, respectively, at an acute angle, each of the first and second arms having a distal end at a rear end of the upper seating platform;
(c) the treestand having a first configuration in which the upper seating platform and the lower standing platform are separated from each other, with each platform having an attachment device extending between the distal ends of the first and second arms thereof, such that each platform is configured to be independently secured to a vertical structure; and
(d) the treestand having a second configuration in which the lower standing platform and the upper seating platform are positioned with their rear ends abutting each other and are rigidly connected to each other with the distal ends of the first and second arms of the lower standing platform disposed adjacent to and aligned with respective distal ends of the first and second arms of the upper seating platform, and with the distal ends of the first and second sides of the lower standing platform abutting and aligned with respective distal ends of the first and second sides of the upper seating platform.

11. The convertible treestand according to claim 10, wherein in the second configuration, the wheel assembly is connected to the treestand to provide a rolling cart.

12. The convertible treestand according to claim 10, wherein:
(a) the lower standing platform includes a connector positioned at each distal end of the first and second spaced-apart sides;
(b) the upper seating platform includes a connector positioned at each distal end of the first and second spaced-apart sides; and
(c) wherein the connector of the lower standing platform is configured for mating engagement with the connector of the upper seating platform to rigidly connect the lower standing platform and upper seating platform in the second configuration.

13. The convertible treestand according to claim 10, further including:
(a) a bracket extending between the first and second arms of the lower standing platform, the bracket having at least one connector disposed thereon;
(b) a bracket extending between the first and second arms of the upper seating platform, the bracket having at least one connector disposed thereon; and
(c) wherein the at least one connector disposed on the bracket extending between first and second arms of the lower standing platform mates with the at least one connector disposed on the bracket extending between first and second arms of the upper seating platform to rigidly connect the lower standing platform to the upper seating platform in the second configuration.

14. A method of converting the treestand of claim 6 to a cart, comprising the steps of:
(a) forming a cart assembly by:
(i) removing the wheel assembly from the open storage well;
(ii) positioning the lower standing platform and upper seating platform such that a rear end of the lower standing platform is abutted with a rear end of the upper seating platform;
(iii) connecting distal ends of the first and second spaced-apart sides of the lower standing platform to corresponding distal ends of first and second sides of the upper seating platform; and
(iv) connecting first and second connectors of the lower standing platform to respective first and second connectors of the upper seating platform, such that distal ends of first and second arms of the lower standing platform and distal ends of first and second arms of the upper seating platform are substantially aligned; and
(b) connecting the wheel assembly to the cart assembly.

15. The method according to claim 14, wherein the wheel assembly includes a wheel having an axle extending therethrough, a tire mounted on the wheel, and first and second brackets secured to opposing sides of the axle.

16. The method according to claim 15, wherein the first and second brackets connect the wheel assembly to the cart assembly.

17. The method according to claim 14, wherein the step of connecting the wheel assembly includes the step of connecting the wheel assembly to a center position of the cart assembly.

18. The method according to claim 14, wherein the step of connecting the wheel assembly includes the step of connecting the wheel assembly to a non-centered position of the cart assembly.

* * * * *